Patented Aug. 19, 1924.

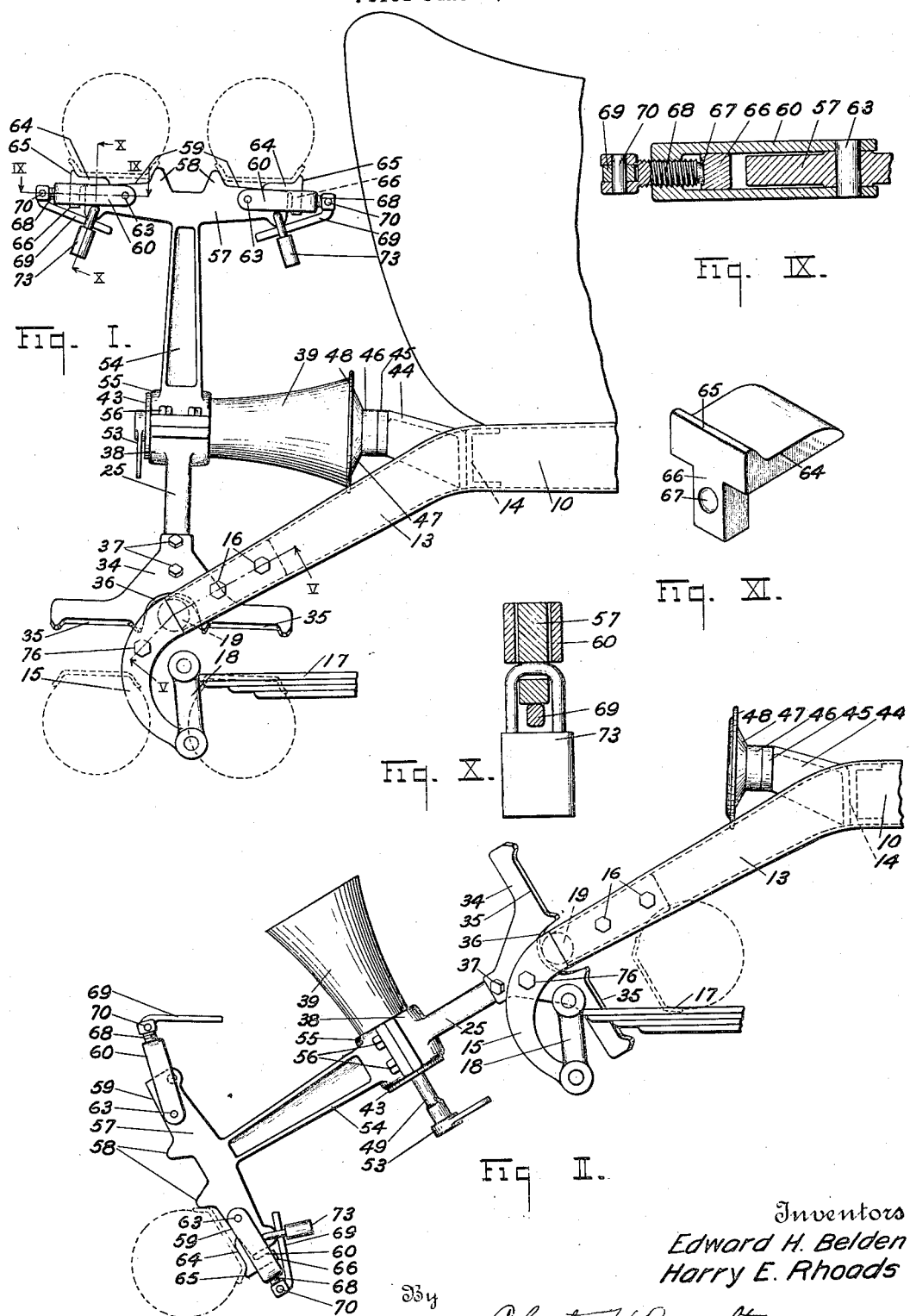

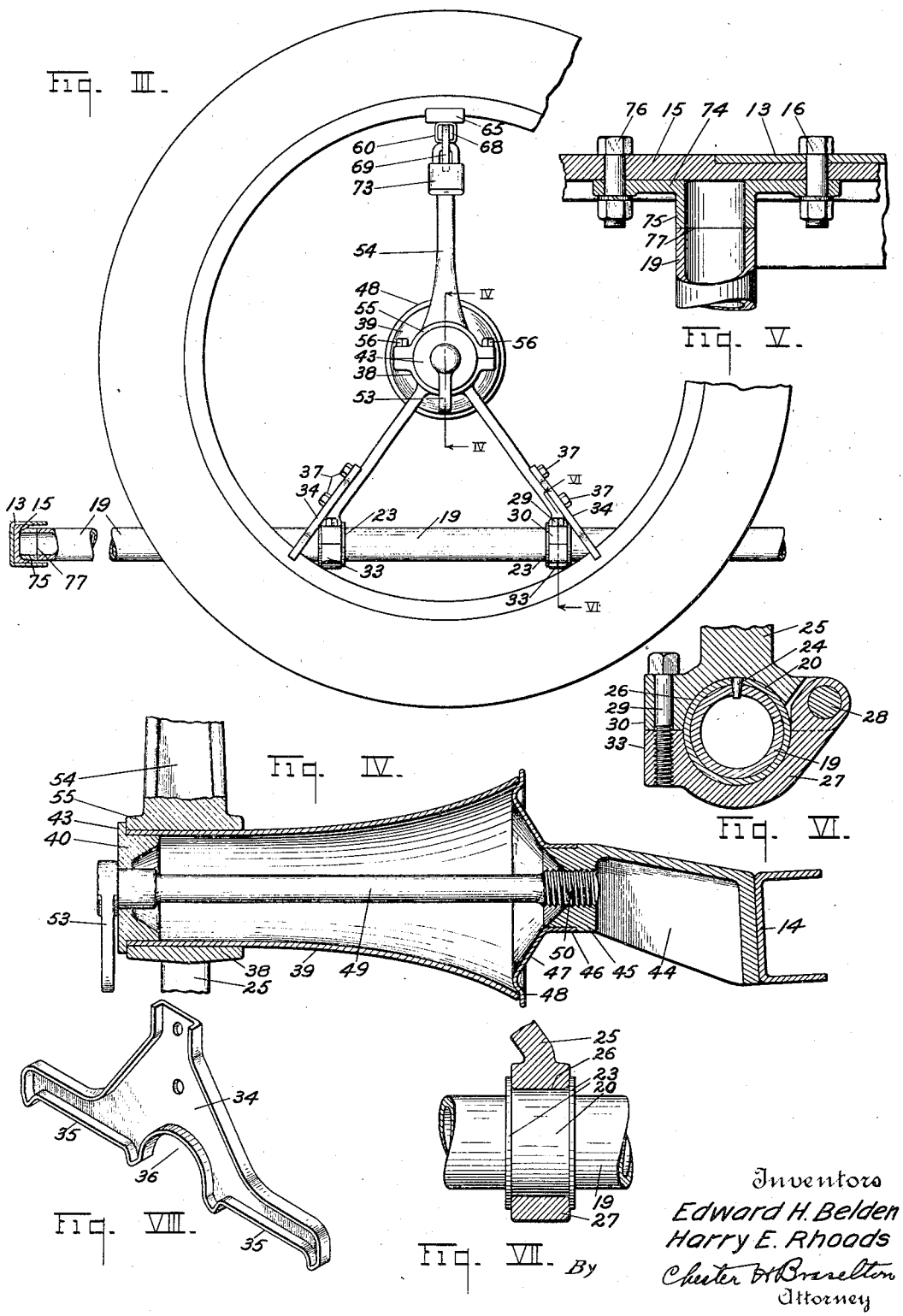

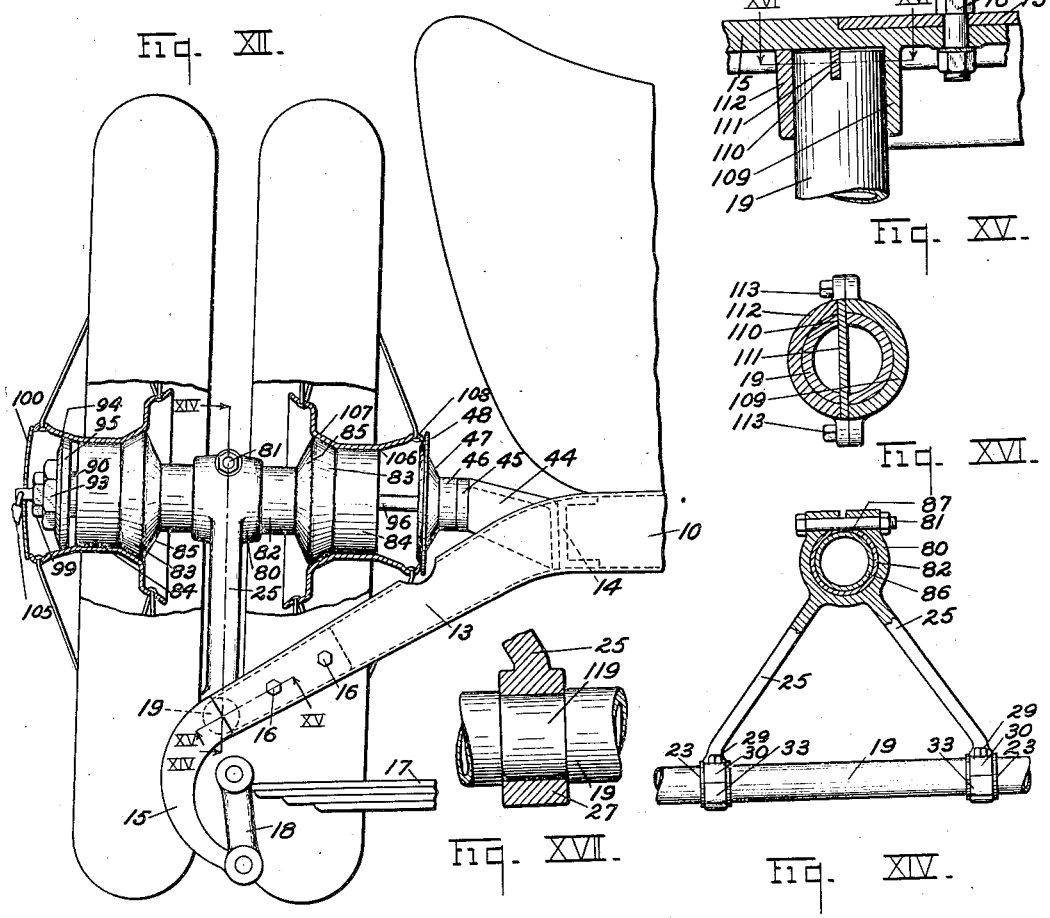

1,505,526

UNITED STATES PATENT OFFICE.

EDWARD H. BELDEN AND HARRY E. RHOADS, OF TOLEDO, OHIO, ASSIGNORS, BY MESNE ASSIGNMENTS, TO THE WILLYS-OVERLAND COMPANY, OF TOLEDO, OHIO, A CORPORATION OF OHIO.

CARRIER FOR SPARE RIMS AND WHEELS.

Application filed June 4, 1917. Serial No. 172,720.

*To all whom it may concern:*

Be it known that we, EDWARD H. BELDEN and HARRY E. RHOADS, citizens of the United States, residing at Toledo, in the county of Lucas and State of Ohio, have invented certain new and useful Improvements in Carriers for Spare Rims and Wheels, of which we declare the following to be a full, clear, and exact description.

This invention relates to improvements in carriers for demountable rims and wheels, and particularly to carriers of the type which are secured to the rear end of the automobile frame.

In the manufacture of automobiles, wire wheels are usually substituted for wooden wheels only on special orders and it is highly desirable that the carrier for the spare rims or wheels be so constructed that the parts thereof which are permanently attached to the chassis frame, should be the same, no matter whether rims or wheels are to be used. One of the objects of this invention is to provide a carrier which meets this requirement. A further object of this invention is to provide a carrier adapted to hold two rims or wheels, and so constructed that either one of the rims or wheels can readily be removed. A further object of this invention is to provide a carrier which is so mounted that it can be swung down towards the ground to facilitate the removal of the rim or wheel. A further object of this invention is to provide a carrier so constructed that the rim or wheel can be locked in place thereon to prevent unauthorized removal. A further object of this invention is to provide a carrier so constructed as to form a strong and rigid support for the spare rims or wheels, so that they cannot rattle or work loose from the carrier. Further objects and objects relating to economies of manufacture and details of construction will definitely appear from the detailed description to follow:

We accomplish the objects of this invention by the devices and means described in the following specification. Certain embodiments of this invention are clearly defined and pointed out in the appended claims.

A structure, constituting a preferred embodiment of this invention, is illustrated in the accompanying drawings, forming a part of this specification, in which:

Figure I is a fragmentary view in side elevation, showing the rear end of an automobile equipped with a carrier for spare rims constructed in accordance with this invention.

Figure II is a view similar to Figure I, but showing the carrier swung down towards the ground to permit of the removal of the inner rim.

Figure III is a fragmentary view in end elevation of the carrier shown in Figure I.

Figure IV is an enlarged, detail sectional view, taken substantially on the line IV—IV of Figure III.

Figure V is an enlarged, detail, sectional view, taken substantially on the line V—V of Figure I.

Figure VI is an enlarged, detail, sectional view, taken substantially on the line VI—VI of Figure III.

Figure VII is an enlarged, fragmentary, detail view, partly in section, showing the manner in which the legs of the supporting member are mounted on the brace rod extending between the ends of the side bars of the automobile frame.

Figure VIII is a detail, perspective view of one of the rim engaging members secured to the legs of the supporting member.

Figure IX is a detail, sectional view taken substantially on the line IX—IX of Figure I.

Figure X is a detail sectional view taken substantially on the line X—X of Figure I.

Figure XI is a detail, perspective view of the wedge for locking the spare rim on the carrier.

Figure XII is a fragmentary view in side elevation showing the rear end of an automobile equipped with a carrier for demountable wheels constructed in accordance with this invention.

Figure XIII is an enlarged, sectional view, centrally through the hub of the wheel supported on this carrier, corresponding somewhat to the section shown in Figure IV.

Figure XIV is a detail sectional view taken substantially on the line XIV—XIV of Figure XII.

Figure XV is a detail sectional view taken substantially on the line XV—XV of Figure XII.

Figure XVI is a detail sectional view taken substantially on the line XVI—XVI of Figure XV.

Figure XVII is a detail view partly in section, showing a method of mounting the legs of the supporting member on the brace rod.

In the drawings, similar reference numerals refer to similar parts throughout the several views, and sectional views are taken looking in the direction of the little arrows at the end of the section lines.

Considering the numbered parts of the drawings, it will be seen that this invention is shown as embodied in a construction attached to the rear end of an automobile frame, in which 10 are the side members, 14 the rear cross bar connecting said side members, and 13 the downwardly bent extensions from said side frame members 10. The downwardly and forwardly curved members 15 are secured to the ends of the extensions 13 by means of the bolts 16. The rear ends of the spring 17 are connected to the lower ends of members 15 by the links 18. A brace rod 19 is secured at its ends to said members 15, and extends between said members. The carrier is pivotally mounted upon said connecting brace rod 19, so as to swing from the position shown in Figure I to the position shown in Figure II.

A pair of collars 20, provided with flanges 23 at the edges thereof, are secured to the rod 19, at a suitably spaced interval, by means of pins 24, and the legs 25 of the carrier supporting member are provided at their lower ends with half round bearing surfaces 26, which seat upon said collars 20 between flanges 23. A retaining block 27 is pivotally connected by the pin 28 to the foot of each leg 25 and seats on the collar 20 between flanges 23, being releasably connected to the foot of the leg 25 by the bolt 29 extending through the flanges 30 and 33 on said parts and threaded into the flange 33. This construction is clearly shown in Figure VI of the drawing.

A T-shaped member 34 is secured to each leg 25 by the bolts 37, and the head of this T-shaped member is provided with a pair of depressions 35 each adapted to receive a spare rim and hold it against all lateral movement, and a semi-circular recess 36 between said depressions 35 which serves to accommodate the rod 19, so that when two spare rims are supported in place on the carrier, they lie on opposite sides of the rod 19, as appears from Figures I and III of the drawing. The legs 25 converge towards each other and carry at their upper end a half round bearing seat 38, in which is disposed the forward end of the frusto-conical sheet metal tube 39. Cylindrical block 40 is disposed within the outer end of said tube and serves to stiffen the same, said block being provided with a circular peripheral flange 43, which engages the outer edge of said tube, and said bearing seat, as is clearly shown in Figure IV.

Casting 44 is suitably secured to the cross bar 14 at about the midpoint thereof, and is provided at its outer end with cylindrical boss 45 to which is secured the cylindrical flange 46, formed at the center of the dished disk 47, which is provided with a peripheral flange 48 of a diameter suitable to receive the inner end of the frusto-conical tube 39. This affords a broad bearing surface for the inner end of the tube 39 and yielding seat for the same, so that it can be securely clamped in place and will be held rigidly without rattle or vibration. A locking rod 49 is journaled in the block 40 and the threaded inner end 50 of said rod is screwed into a threaded opening provided in the cylindrical boss 45. Said bolt is provided with a handle 53 by which it may be operated.

The rear cross bar 14 and the brake rod 19 of the frame constitute supporting elements for suitably supporting the tire carrier or swinging member in upright tire supporting position.

The upwardly extending arm 54 is provided at its lower end with a half round seat 55, which corresponds to the half round seats 38 on the ends of the legs 25, and is secured thereto by means of clamping bolts 56. A T-shaped head 57 is formed on the upper end of arm 54 and provided with centrally disposed projections or flanges 58 which engage the inner edges of the spare rims, when said rims are mounted in place on the carrier to prevent the shifting of said rims inwardly relative to said head 57. The surface of the head 57 is inclined outwardly and downwardly away from the projections 58, to form inclined plane surfaces 59 on which the wedges 64 may slide. A yoke 60 is pivotally mounted at each end of the head 57 and embraces the same, being pivoted thereto by means of the pin 63, extending through the legs of said yoke 60 and through said head 57, as clearly appears from Figure IX. Wedges 64 provided with a flange 65, at one end thereof, and with a downwardly depending lug 66 are mounted in said yokes 60. The lug 66 is provided with a depression 67 engageable by the end of bolt 68, which is threaded through the base of the yoke 60 and provided with a handle 69, pivoted thereto by means of the pin 70, and which may be locked to the head 57 by means of the padlock 73.

As shown in Figure V of the drawing, each channel member 13 has an extension 15 secured thereto, said extension being of such width that it fits within the sides of the channel 13. A casting 74, provided with a hollow socket 75, fits within the flanged edges of the extension 15 and is secured thereto by bolts 76 and 16. The ends of the rod 19 are secured to the hollow socket 75 by a butt weld 77.

In Figures XII to XIV we have shown a carrier especially designed and adapted for carrying a pair of spare demountable wheels. In this embodiment of our invention, the legs 25 of the supporting member carry at their upper end a split collar 80, the parts of which are secured and drawn together by means of the bolt 81. A cylindrical tube 82 is secured within the split collar 80, said tube being provided with an inner reinforcing tube 86 and a cross slot 87, in which a part of the bolt 81 is disposed, so as to prevent lateral shifting of said tube, relative to the collar 80. At the ends of said tube, there are provided tapering conical surfaces 83 and cylindrical surfaces 84, which face oppositely, and which are connected with the ends of the cylindrical tube 82, by means of the frustro-conical surfaces 85, so that the carrier core comprises the cylindrical tube 82, the flanges 85 at the ends of said tube extending outwardly therefrom, the frustro-conical surfaces 83 extending downwardly and outwardly from the edges of said portions 85, and the cylindrical portions 84 at the extreme ends of said core. Portions 84 and 83 are adapted to receive the outer hub shell of a demountable wheel with the cylindrical portion 106 of the hub shell engaging the cylindrical portion 84 and the tapered conical surface 107 engaging the tapered conical surface 83, as clearly shown in Figures XII and XIII of the drawing. At the outer end of the carrier core, a disc 88 is provided, having a peripheral flange 89 secured to the inner surface of the outer end of said core and provided with a central flange 90, which is externally threaded to receive a nut 93. Secured to said nut is the disc 94, having an inwardly tapering flange 95, adapted to engage a portion of the hub shell mounted on said core so as to force it firmly into engagement therewith.

A locking bolt 96 has the inner end thereof threaded at 97 and screwed into a threaded opening in said cylindrical boss 45, and the outer end of said bolt is provided with a flange 98, forming a bearing therefor, within the flange 90. The outer end of said bolt is provided with a hexagonal nut 99, by means of which the bolt may be turned, and has a stem 103 extending outwardly therefrom and through a central opening in the disc 100, which covers the end of the hub secured on said core, and which cover may be locked on said bolt by means of padlock 105. 108 represents the outer edge of the hub shell of the demountable wheel, which is of such a diameter that it engages the flange 48 of the disc 47, secured to the cylindrical boss 45, so that said disc forms a broad bearing surface for said hub shell and holds it firmly in position. The disc 100 is likewise of such diameter as to engage the edge of the outer hub shell, so that, when the demountable hubs are in position, they are completely enclosed and held firmly and rigidly so that there can be no rattle or vibration.

In Figures XV and XVI we have shown a modified manner of securing the connecting cross bar 19 to the extensions 15. The extensions 15 are provided with half round sockets 109, integral therewith, and the ends of the cross rod 19 are provided with slots 110, in which the keys 111 are disposed, said keys projecting beyond the cross rod 19 and being engaged by the edges of the half round caps 112, which fit around the ends of the cross rod 19, and co-operate with the half round sockets 109, so that, when they are clamped thereto by the bolts 113, the cross rod is held in place securely and firmly and in such a manner that it cannot twist or turn.

In Figure XVII, we have shown another method of pivotally mounting the legs 25, in which grooves 119 are formed in the rod 19. The legs 25 co-operate with this groove in the same way that they co-operate with the flanged collars 20.

The modified form of the invention illustrated in Figures XII to XVII is described and claimed in applicants' co-pending application Serial Number 183,497, filed July 30, 1917.

From the description of the parts given above, the operation of our device should be very readily understood. In Figure I, we have shown the carrier in position with two spare rims carried thereon, said spare rims and the tires thereon being indicated by dotted lines. In order to remove the outer rim, the padlock 73 is unlocked releasing the handle 69 pivotally connected to the end of the bolt 68, and said bolt 68 is unscrewed so as to withdraw the wedge 64 and permit the yoke 60 to swing downwardly, carrying the wedge 64 with it and freeing the outer flange of the spare rim. The spare rim can then be moved away from the head 57, and lowered from the depressions 35 on the T-shaped members 34 at the bottom so as to remove said rim. Mounting the rim in place upon the carrier, the rim is held in position with the flanges disposed in the depressions 35 of the T-shaped members 34 at the bottom, and the upper part of the rim is shoved laterally over the head 57 until the inner flange engages the projection 58. The yoke 60 is then swung upwardly, carrying the wedge 64 with it, and the bolt 68 is screwed inwardly forcing the wedge under the rim and into engagement with the outer flange thereof, so as to wedge the rim upwardly and laterally to force it into a tight engagement with the head 57. The handle 69 is then swung downwardly and locked to the head 57 by the padlock 73, and it will be impossible to remove the rim from the carrier without unlocking the padlock 73.

This carrier is designed to carry two spare rims and, when one wishes to remove the spare rim carried on the inside, or nearest the body of the vehicle, bolt 49 is rotated to unscrew the threaded portion 50 thereof from the threaded opening in the cylindrical boss 45 on the casting 44 secured to the cross bar 14. When bolt 49 has thus been unscrewed, the supporting member can be swung downwardly to the position shown in Figure II toward the ground in which position the edge of the carrier may be supported thereby. In this position, a tire with a wheel and rim may be easily applied to or removed from the carrier. The spare rim, which was formerly nearest the body of the vehicle, is then uppermost, as will clearly appear from Figure II, and can be removed in the same manner that the other rim was removed. It will appear that this furnishes a construction facilitating the carrying of two spare rims and which makes it possible to remove either one of said rims without any difficulty whatsoever, and without removing the other one of the pair. Hence if one wishes to remove the outer rim he can do so without swinging the carrier down, and if one wishes to remove the inner rim, the carrier can be swung down and the inner rim can be removed without disturbing the outer rim.

The inner edge of the conical tube 39 corresponds in diameter to the diameter of the peripheral flange 48 and rests thereon, said disc 47 forming a yielding support for the edge of the conical tube 39, so that the carrier can be held firmly and rigidly in position without any rattle or vibration. Furthermore, the locking bolt 49 is enclosed so that the carrier forms a very neat and sightly appearance.

In Figures XII, XIII and XIV we have shown a construction adapted for carrying demountable wheels. Figure XII shows a pair of wire wheels locked in place on the carrier. If one wishes to remove the outer wheel the padlock 105 is released so that the cover 100 can be removed from the projecting end 103 of the locking bolt 96. Nut 93 is then unscrewed from the externally threaded flange 90, carrying with it the disc 94, and when this nut and disc has been removed, the outer hub shell can be slipped off of the end of the carrier core. In doing this, the inner wheel, or the one carried next to the body of the vehicle, is not disturbed in any manner.

When one wishes to remove the inner wheel, the locking bolt 96 can be disconnected from the cylindrical boss 45 by rotating the same by means of the hexagon 99, and the carrier can then be swung down to a position corresponding to that shown in Figure II, since the legs 25 of the carrier are pivotally mounted on the cross rod 19. When swung to this position, the wire wheel on the inner end of the carrier core can be removed without any further operation. When the carrier core is held in its normal position by means of the locking bolt 96, the outer edge 108 of the inner hub shell engages the peripheral flange 28 on the dished disc, so that the dished disc closes the outer end of the hub shell and forms a broad and yielding bearing surface therefor, so that the carrier can be firmly and rigidly held in position. Neither of the wheels can be removed without unlocking padlock 105, and either one of these wheels can be removed without disturbing the other wheel. Furthermore, this carrier affords a very strong and rigid support for demountable wheels, which are usually quite heavy, and one in which the parts are sightly in appearance.

We are aware that the particular embodiment of our invention which we have here shown is highly desirable from many standpoints. But we are also aware that this embodiment may be varied considerably without departing from the spirit of our invention, and therefore, we desire to claim our invention both broadly and specifically, as indicated by the appended claims.

Having thus described our invention, what we claim as new and desire to secure by Letters Patent is:

1. The combination with an automobile frame, comprising side bars, having their rear ends extending downwardly, a cross bar and a brace rod extending between the rear ends of said side bars; of a supporting member having a pair of legs with their lower ends journaled on said brace rod, and united at their upper ends; a member secured to said cross bar and having a boss with a threaded opening therein; a disc, secured to said boss; a carrier tube; and a bolt coacting with said supporting member taking into said threaded opening and disposed within said tube, for rigidly connecting said supporting member to said cross bar with said tube in contact with said disk.

2. The combination with an automobile frame, comprising side bars, a cross bar, and a brace rod extending between the rear ends of said side bars; of a supporting member having a pair of legs with lower ends journaled on said brace rod, and united at their upper ends; a member secured to said cross bar, and having a cylindrical boss with a threaded opening therein; a disc, having a central cylindrical flange secured to said boss, and a peripheral flange; a carrier tube; and a bolt co-acting with said supporting member and threaded opening, and disposed within said tube for drawing the latter against said peripheral flange and rigidly connecting said supporting member to said cross bar.

3. The combination with an automobile frame, comprising side bars and cross bar; of a supporting member pivotally connected with said frame; a member secured to said cross bar and having a boss with a threaded opening therein; a disc secured to said boss; a carrier tube carried by said supporting member; and a bolt co-acting with said supporting member, and disposed within said tube, for drawing the latter against said disc and rigidly connecting said supporting member to said cross bar.

4. The combination with an automobile frame, comprising side bars and a cross bar; of a supporting member pivotally mounted on said frame; a member secured to said cross bar and having a threaded opening therein; a dished disc carried by said member and having a peripheral flange; a tube carried by said supporting member with its inner edge adapted to engage the said flange; a block mounted in the outer end of said tube; a locking bolt journaled in said block and having a threaded inner end screwed into the threaded opening in said member; an arm extending upwardly from said supporting member and provided with a T-shaped head having a pair of projections near the center thereof, yokes pivoted on the ends of said head, wedges adjustably carried by said yokes, and means for locking said wedges in adjusted position; and a pair of T-shaped members carried by said supporting member, and each having a pair of depressions, adapted to receive a pair of rims to hold the same against lateral movement.

5. The combination with an automobile frame, comprising side bars and a cross bar; of a supporting member pivotally mounted on said frame; a member secured to said cross bar and having a peripheral flange; a tube carried by said supporting member with its inner edge adapted to engage said flange; a block mounted in the outer end of said tube; a locking bolt journaled in said block and having a threaded inner end screwed into the member secured to the cross bar; an arm extending upwardly from said supporting member and provided with a T-shaped head, having a pair of projections near the center thereof, yokes pivoted on the ends of said head, wedges adjustably carried by said yokes, and for locking said wedges in adjusted position; and means carried by said supporting member and adapted to receive a pair of rims to hold the same against lateral movement.

6. The combination with an automobile frame, comprising side bars and a cross bar; of a supporting member pivotally mounted on said frame; a member secured to said cross bar and having a threaded opening therein; a dished disc carried by said member having a peripheral flange; a tube carried by said supporting member, with its inner edge adapted to engage said flange; a block mounted in the outer end of said tube; a locking bolt journaled in said block and having a threaded inner end screwed into the threaded opening in said member; and an arm extending upwardly from said supporting member and provided with a T-shaped head, having a pair of projections near the center thereof, yokes pivoted on the ends of said head, wedges adjustably carried by said yokes, and means for locking said wedges in adjusted position.

7. The combination with an automobile frame, comprising side bars and a cross bar; of a supporting member pivotally mounted on said frame; a member secured to said cross bar and having a threaded opening therein; a disc carried by said member and having a peripheral flange; a tube carried by said supporting member, with its inner edge adapted to engage said flange; a block mounted in the outer end of said tube; a locking bolt journaled in said block and having a threaded inner end screwed into the member secured to said cross bar; and an arm extending upwardly from said supporting member and provided with a T-shaped head, having a pair of projections near the center thereof, yokes pivoted on the ends of said head, and wedges adjustably carried by said yokes.

8. The combination with an automobile frame, comprising side bars and a cross bar; of a supporting member pivotally mounted on said frame; a member secured to said cross bar and having a threaded opening therein; a disc carried by said member and having a peripheral flange; a tube carried by said supporting member with its inner edge adapted to engage the said flange; a block mounted in the outer end of said tube; a locking bolt journaled in said block and having a threaded inner end screwed into the threaded opening in said member; and an arm extending upwardly from said supporting member and provided with a head adapted to receive a pair of rims and means adapted to releasably hold said rims against lateral movement.

9. The combination with an automobile frame, comprising side bars and a cross bar; of a supporting member pivotally mounted on said frame; a member secured to said cross bar and having a threaded opening therein; a disc carried by said member and having a peripheral flange; a tube carried by said supporting member, with its inner edge adapted to engage the said flange; a block mounted in the outer end of said tube; a locking bolt journaled in said block and having a threaded inner end screwed into the threaded opening of said member; and an arm extending upwardly from said supporting member and provided with a head adapted to receive a rim, and means on said head for releasably holding said rim against lateral movement.

10. The combination with an automobile frame, comprising side bars and a cross bar; of a supporting member pivotally mounted on said frame; a member secured to said cross bar and having a threaded opening therein; a tube carried by said supporting member; a block mounted in the outer end of said tube; a locking bolt journaled in said block and having a threaded inner end screwed into the threaded opening in said member; an arm extending upwardly from said supporting member and provided with a head adapted to receive a rim; and means on said head for releasably holding said rim against lateral movement.

11. The combination with an automobile frame, comprising side bars and a cross bar; of a supporting member pivotally mounted on said frame; a member secured to said cross bar and having a threaded opening therein; a locking bolt journaled in said supporting member and having a threaded inner end screwed into the threaded opening in said member; an arm extending upwardly from said supporting member, and provided with a head adapted to receive a rim; and means on said head adapted to releasably hold said rim against lateral movement.

12. The combination with an automobile frame, comprising side bars and a cross bar; of a supporting member pivotally mounted on said frame; releasable means rigidly connecting said supporting member with said cross bar; an arm extending upwardly from said supporting member and provided with a head adapted to receive a rim; and means on said head adapted to releasably hold said rim against lateral movement.

13. The combination with an automobile frame, comprising side bars and a cross bar; of a supporting member pivotally mounted on said frame, releasable means for rigidly connecting said supporting member with said cross bar; a pair of T-shaped members secured to said supporting member at separated points and provided with means adapted to receive a rim and hold same against lateral movement; an arm extending from said supporting member and provided with a head adapted to receive a rim; and means on said head adapted to releasably hold said rim against lateral movement.

14. The combination with an automobile frame, comprising side bars and a cross bar; of a supporting member pivotally mounted on said frame; releasable means for rigidly connecting said supporting member with said cross bar; an arm extending from said supporting member and provided with a T-shaped head, having a pair of projections near the center thereof, yokes pivoted on the ends of said head, wedges adjustably carried by said yokes and means for locking said wedges in adjusted position; and a pair of T-shaped members carried by said supporting member, and each having a pair of depressions adapted to receive a pair of rims and hold the same against lateral movement.

15. The combination with an automobile frame, comprising side bars and a cross bar; of a supporting member pivotally mounted on said frame; releasable means for rigidly connecting said supporting member to said cross bar; an arm extending from said supporting member, and provided with a T-shaped head having a pair of projections near the center thereof, yokes pivoted on the ends of said head, wedges adjustably carried by said yoke, and means for locking said wedges in adjusted position; and means carried by said supporting member and adapted to receive a pair of rims and hold the same against lateral movement.

16. The combination with an automobile frame, comprising side bars and a cross bar; of a supporting member pivotally mounted on said frame; releasable means for rigidly connecting said supporting member to said cross bar; and an arm extending from said supporting member and provided with a T-shaped head, having a pair of projections near the center thereof, yokes pivoted on the ends of said head, wedges adjustably carried by said yoke and means for locking said wedges in adjusted position.

17. The combination with an automobile frame, comprising side bars and a cross bar; of a supporting member pivotally mounted on said frame; releasable means for rigidly connecting said supporting member to said cross bar; an arm extending from said supporting member and provided with a T-shaped head, having a pair of projections near the center thereof; yokes pivoted on the ends of said head; and wedges adjustably carried by said yokes.

18. In a device of the class described, the combination of a carrier supporting member; an arm extending from said supporting member and provided with a projection against which one flange of a demountable rim is adapted to abut; a yoke pivotally mounted on said head; a wedge adjustably carried by said yoke, and adapted to force said rim against said projection; and means for locking said wedge in adjusted position.

19. In a device of the class described, the combination of a supporting member provided with a plurality of members engaging the flange of a wheel rim; an arm extending from the supporting member, and provided with a head having a projection against which one flange of the demountable rim is adapted to abut; a wedge carried by said head and adjustable beneath said rim to force it against said projection; and means for locking said wedge in adjusted position.

20. In an automobile frame, the combination of channel-shaped side bars; extensions mounted at the rear ends of said channel-shaped side bars, between the sides thereof, said extensions being provided with flanges at the edges thereof; bracket members mounted in said extensions between the side flanges thereof; means connecting said extensions to said side bars and said bracket members to said extensions, and a brace rod connected at each end to said bracket members.

21. The combination with an automobile frame, of a carrier supported thereby, said carrier including a supporting member pivoted to a portion of the said frame, means carried by said member for supporting a tire, means for releasably connecting said supporting member to another portion of said frame, and yieldable means interposed between said frame and said supporting member of said carrier when secured to said frame, to absorb vibration.

22. The combination with an automobile frame having rearwardly extending ends, a cross bar and a brace-rod extending between said ends, of a carrier including a supporting member having a pair of legs journaled on said brace-rod, means on said supporting member for carrying a tire, means for securing said supporting member to said cross bar, a yieldable disk carried by said cross bar and co-operating with means carried by the supporting member to absorb vibration and permit said supporting member to be firmly secured to said cross bar by said securing means.

23. In a device of the class described the combination of a central member adapted to be releasably secured to a portion of a vehicle frame, a plurality of arms extending radially from said central member, means carried by an arm for pivotly supporting said device from another portion of the vehicle frame and means carried by said arms for supporting a vehicle tire with a rim.

24. In a device of the class described the combination of a central member adapted to be releasably secured to a portion of a vehicle frame, a plurality of arms extending radially from said central member, means carried by an arm for pivotly supporting said device from another portion of the vehicle frame, means carried by said arms for supporting a vehicle tire with a rim and means for locking said tire on said last mentioned means.

25. In combination with an automobile frame, a tire rim carrier supported by the frame and mounted for bodily pivotal movement in a vertical plane, means for detachably securing a tire rim to either side of the carrier so as to permit removal and replacement of one of said rims in one position of the carrier while the other rim is mounted for removal or replacement in the other position of the carrier.

26. In a carrier for demountable rims, the combination with a vehicle frame, of a swinging member having one end pivotally connected with the frame and having a releasable connection with said frame, and means attached to the swinging member and projecting upon both sides thereof for securing demountable rims on either side of said swinging member.

27. In a carrier for demountable rims, the combination with supporting elements spaced apart, of a swinging member having a pivotal connection with one of said elements and a releasable connection with the other supporting element, and means projecting upon opposite sides of the swinging member for supporting and retaining demountable rims upon the said swinging member.

28. In a tire carrier, the combination with a vehicle frame, of a single swinging bar having one end pivotally connected with the frame and the other end having a releasable connection with the said frame, and means borne by the bar and projecting on both sides thereof whereby tires are supported solely by the bar.

29. In a vehicle having a frame of sidebars and a rear cross-bar, the combination with a cross-bar in rear of the rear cross-bar and extending between the side bars of the vehicle frame, of a bar secured to both of said cross-bars, and means upon said bar for engaging and carrying a rim.

30. In a vehicle having a frame comprising side-bars and cross-bars, a single bracket mounted midway of said side bars upon one of said cross-bars, provided with a portion adapted to interchangeably receive the central portions of a spare wheel support or a rim support.

31. In a vehicle, the combination with the frame having side-bars and cross-bars, of a bar mounted upon one of said cross-bars and between said side-bars, said bar having a portion adapted to interchangeably receive the central portions of a spare wheel support or a rim support.

32. In a vehicle, the combination with the frame having side-bars and cross-bars, of a cross-bar in rear of the rear cross-bar of the frame and extending between the side-bars thereof, a bar extending transversely of said last mentioned cross-bar and secured thereto, and a rim carrier on said transversely extending bar.

In testimony whereof we affix our signatures.

EDWARD H. BELDEN.
HARRY E. RHOADS.